(12) United States Patent
Rautiainen et al.

(10) Patent No.: US 10,981,048 B2
(45) Date of Patent: Apr. 20, 2021

(54) COMPOSITE BOARD TO SUPPORT A WEIGHT OF A USER OF A PERSONAL TRANSPORTATION VEHICLE

(71) Applicant: Neutron Holdings, Inc., San Francisco, CA (US)

(72) Inventors: Jukka Rautiainen, Espoo (FI); Mark Frykman, Mountain View, CA (US); John Ulmen, Emerald Hills, CA (US); Asa Weiss, Santa Rosa, CA (US)

(73) Assignee: NEUTRON HOLDINGS, INC., San Francisco, CA (US)

( * ) Notice: Subject to any disclaimer, the term of this patent is extended or adjusted under 35 U.S.C. 154(b) by 69 days.

(21) Appl. No.: 16/142,271

(22) Filed: Sep. 26, 2018

(65) Prior Publication Data

US 2019/0091551 A1 Mar. 28, 2019

Related U.S. Application Data

(60) Provisional application No. 62/563,551, filed on Sep. 26, 2017.

(51) Int. Cl.
*A63C 17/12* (2006.01)
*A63C 17/01* (2006.01)
(Continued)

(52) U.S. Cl.
CPC ........ *A63C 17/017* (2013.01); *A63C 17/0006* (2013.01); *A63C 17/01* (2013.01); *A63C 17/012* (2013.01); *A63C 17/015* (2013.01); *A63C 17/12* (2013.01); *A63C 17/26* (2013.01); *A63C 19/065* (2013.01); *B60L 50/66* (2019.02); *B60L 58/20* (2019.02); *H01M 2/1083* (2013.01); *A45F 3/04* (2013.01); *A63C 2019/067* (2013.01); *A63C 2203/12* (2013.01); *A63C 2203/14* (2013.01); *A63C 2203/22* (2013.01); *A63C 2203/24* (2013.01); *A63C 2203/42* (2013.01); *B32B 5/245* (2013.01); *B32B 17/062* (2013.01);
(Continued)

(58) Field of Classification Search
CPC ....... A63C 17/01; A63C 17/017; A63C 17/12; A63C 2203/46
USPC .................................................... 280/87.042
See application file for complete search history.

(56) References Cited

U.S. PATENT DOCUMENTS 4,082,306 A * 4/1978 Sheldon ................. A63C 17/01
280/11.28
4,165,089 A * 8/1979 Urdea .................... A63C 17/01
280/87.042

(Continued)

FOREIGN PATENT DOCUMENTS

| CN | 202923418 U | 5/2013 |
|---|---|---|
| EP | 0870641 A | 10/1998 |
| WO | 2014152951 A1 | 9/2014 |

*Primary Examiner* — Jeffrey J Restifo
(74) *Attorney, Agent, or Firm* — Dentons US LLP

(57) ABSTRACT

Methods and apparatus are discussed for an electric-powered personal transportation vehicle with a composite board to support a weight of a user, one or more wheels driven by one or more electric motors, where the electric motors are powered by one or more batteries. The composite board includes a heterogeneous mix of individual components making up the composite board. The composite board includes i) a spine of the composite board made of a hardwood material connected to ii) sides of the composite board made of a vibration-dampening, high-density, foam.

22 Claims, 9 Drawing Sheets

(51) Int. Cl.
  *B60L 58/20* (2019.01)
  *B60L 50/60* (2019.01)
  *A63C 19/06* (2006.01)
  *H01M 2/10* (2006.01)
  *A63C 17/00* (2006.01)
  *A63C 17/26* (2006.01)
  *B32B 17/06* (2006.01)
  *B32B 5/24* (2006.01)
  *A45F 3/04* (2006.01)

(52) U.S. Cl.
  CPC .......... *B32B 17/064* (2013.01); *B32B 17/066* (2013.01); *H01M 2220/20* (2013.01)

(56) References Cited

U.S. PATENT DOCUMENTS

| | | | | |
|---|---|---|---|---|
| 4,182,520 A * | 1/1980 | Stevenson | ............. | A63C 17/01 280/87.042 |
| 4,295,656 A * | 10/1981 | Moore | ............. | A63C 17/01 280/87.042 |
| 5,119,277 A * | 6/1992 | Copley | ............. | A63C 17/26 280/87.042 |
| 5,312,258 A * | 5/1994 | Giorgio | ............. | A63C 17/01 280/14.24 |
| 5,622,759 A * | 4/1997 | Fuster | ............. | A63C 5/124 280/87.01 |
| 6,059,307 A * | 5/2000 | Western | ............. | A63C 5/124 280/609 |
| 6,182,986 B1 * | 2/2001 | Smith | ............. | A63C 17/01 280/610 |
| 6,189,912 B1 * | 2/2001 | Ritzinger | ............. | A63C 5/03 280/14.21 |
| 6,203,037 B1 * | 3/2001 | Wilson | ............. | A63C 17/01 280/87.042 |
| 6,273,440 B1 * | 8/2001 | Wilson | ............. | A63C 17/01 280/87.042 |
| 6,290,249 B1 * | 9/2001 | Wolf | ............. | A63C 5/03 280/14.21 |
| 6,386,561 B1 * | 5/2002 | Hanson | ............. | A63C 17/01 280/11.27 |
| 6,460,868 B2 * | 10/2002 | Madrid | ............. | A63C 17/01 144/349 |
| 6,502,850 B1 * | 1/2003 | Schaller | ............. | A63C 5/03 280/602 |
| 6,527,284 B2 * | 3/2003 | Bert | ............. | A63C 17/01 280/87.041 |
| 6,648,363 B2 * | 11/2003 | Gordon | ............. | A63C 17/01 280/610 |
| 6,663,137 B2 * | 12/2003 | Karlsen | ............. | A63C 5/03 280/14.22 |
| 6,679,513 B1 * | 1/2004 | Emig | ............. | A63C 5/075 280/602 |
| 6,742,780 B1 * | 6/2004 | Rudski | ............. | A63C 17/02 273/109 |
| 6,854,748 B2 * | 2/2005 | Wimbish | ............. | A63C 17/017 280/14.21 |
| 6,886,848 B2 * | 5/2005 | Riepler | ............. | A63C 5/12 280/602 |
| 6,979,006 B2 * | 12/2005 | Pierron | ............. | A63C 17/01 280/87.042 |
| 7,044,486 B2 * | 5/2006 | Wright | ............. | A63C 17/0046 280/87.041 |
| 7,275,755 B2 * | 10/2007 | Marion | ............. | A63C 5/03 280/14.21 |
| 7,347,431 B2 * | 3/2008 | Hill | ............. | A63C 17/01 280/87.01 |
| 7,506,880 B2 * | 3/2009 | Burwell | ............. | A63C 17/01 280/87.01 |
| 7,581,747 B2 * | 9/2009 | Kosmehl | ............. | A63C 5/003 280/601 |
| 7,635,137 B2 * | 12/2009 | Gregory | ............. | A63C 17/0086 280/87.041 |
| 7,654,554 B1 * | 2/2010 | Scaturro | ............. | A63C 5/03 280/610 |
| 7,810,824 B2 * | 10/2010 | Woodall | ............. | A63C 17/01 280/87.041 |
| 8,246,070 B2 * | 8/2012 | Lin | ............. | A63C 5/03 280/11.14 |
| D670,419 S | 11/2012 | Fissell | | |
| D670,696 S | 11/2012 | Cobbett et al. | | |
| 8,356,822 B2 * | 1/2013 | McLeod | ............. | A63C 5/0417 280/14.22 |
| D685,419 S | 7/2013 | Ahmad et al. | | |
| D688,245 S | 8/2013 | Guerra | | |
| D688,664 S | 8/2013 | Guerra | | |
| 8,574,705 B2 * | 11/2013 | Hunter | ............. | B32B 21/14 428/172 |
| 8,936,263 B2 * | 1/2015 | Rawlins | ............. | A63C 17/0093 280/87.042 |
| 9,266,445 B2 | 2/2016 | Dastoor et al. | | |
| 9,399,406 B2 | 7/2016 | Dastoor et al. | | |
| 9,675,868 B2 * | 6/2017 | Willis | ............. | A63C 17/017 |
| 9,827,482 B2 * | 11/2017 | Mackay | ............. | A63C 17/01 |
| 9,943,749 B2 * | 4/2018 | Cerboneschi | ............. | A63C 17/12 |
| 10,137,357 B1 * | 11/2018 | Rosolowski | ............. | B32B 3/08 |
| 10,238,953 B2 * | 3/2019 | Gangemi | ............. | A63C 17/017 |
| 10,377,093 B2 * | 8/2019 | Filippini | ............. | B32B 3/26 |
| 10,478,709 B2 * | 11/2019 | Goehring, Jr. | ............. | A63C 17/017 |
| 2009/0108554 A1 * | 4/2009 | Boyle | ............. | A63C 17/01 280/87.042 |
| 2013/0081891 A1 | 4/2013 | Ulmen et al. | | |
| 2014/0277888 A1 | 9/2014 | Dastoor et al. | | |
| 2016/0121756 A1 | 5/2016 | Dastoor et al. | | |
| 2016/0303997 A1 | 10/2016 | Dastoor et al. | | |
| 2017/0252638 A1 | 9/2017 | Ulmen et al. | | |
| 2017/0259697 A1 | 9/2017 | Dastoor et al. | | |

* cited by examiner

COMPOSITE BOARD TO SUPPORT A WEIGHT OF A USER OF A PERSONAL TRANSPORTATION VEHICLE

RELATED APPLICATIONS

This patent application claims priority to and benefit under 35 USC 119 to U.S. Provisional Patent Application No. 62/563,551, filed Sep. 26, 2017, titled "An electric personal transportation vehicle with various improvements," which is hereby incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to an electric personal transportation vehicle, such as an electric-powered personal transportation vehicle, having a composite board.

BACKGROUND

People need a better mechanism and supporting system to move around safely without the vulnerabilities of traditional skateboards.

SUMMARY

Provided herein are some embodiments. In an embodiment, the design is directed to an electric-powered personal transportation vehicle.

Methods and apparatus are discussed for an electric-powered personal transportation vehicle with a composite board to support a weight of a user, one or more wheels driven by one or more electric motors, where the electric motors are powered by one or more batteries. The composite board includes a heterogeneous mix of individual components making up the composite board. The composite board includes i) a spine of the composite board made of a hardwood material connected to ii) sides of the composite board made of a vibration-dampening, high-density, foam.

These and other features of the design provided herein can be better understood with reference to the drawings, description, and claims, all of which form the disclosure of this patent application.

DRAWINGS

The drawings refer to some embodiments of the design provided herein in which.

Figure 1:
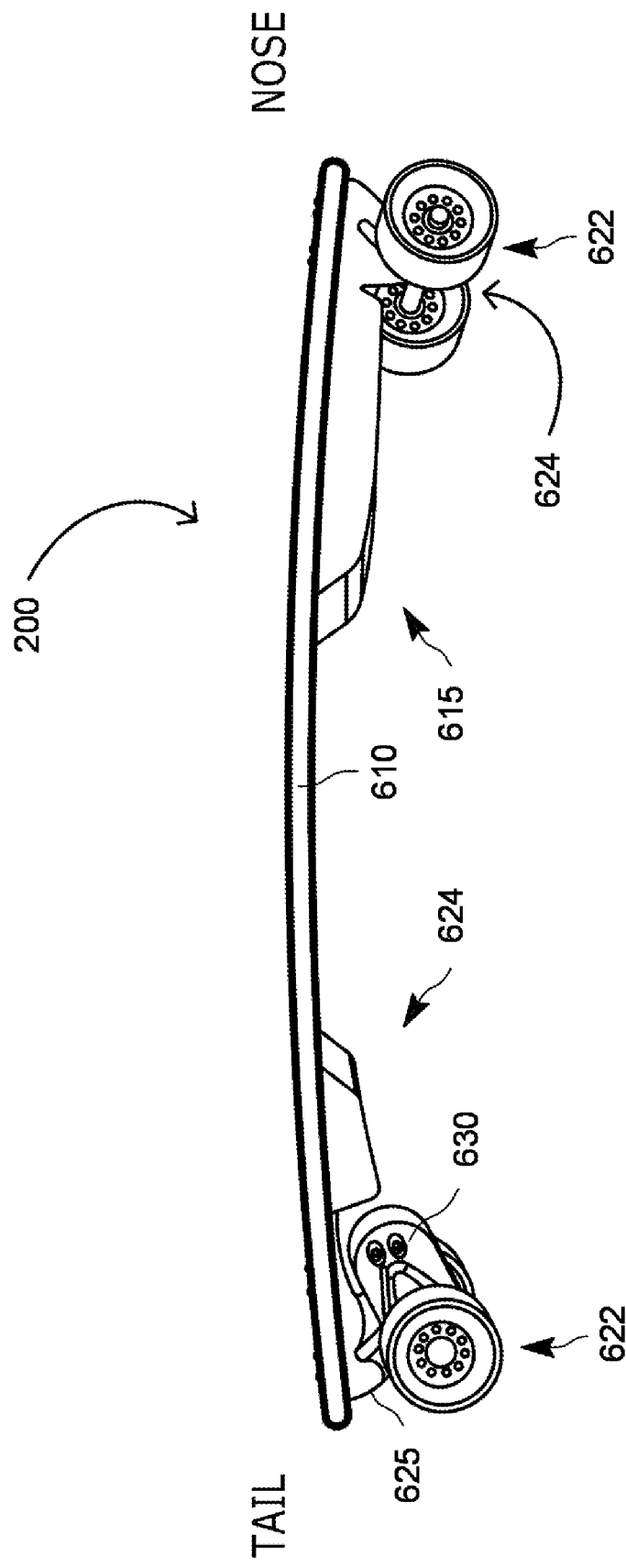
FIG. 1 illustrates an example embodiment of an electric-powered personal transportation vehicle that includes a deck, one or more wheels, and one or more electric motors mounted to a drive truck.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of wheels in a device, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first electric-powered skateboard, can be made. However, the specific numeric reference should not be interpreted as a literal sequential order but rather interpreted that the first electric-powered skateboard is different than a second electric-powered skateboard. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

The Electric Personal Transportation Vehicle Features

In general, the design is directed to an electric personal transportation vehicle, such as i) an electric-powered skateboard, ii) an electric-powered scooter, iii) an electric-powered wheelchair, and iv) other personal transportation vehicles.

The electric-powered personal transportation vehicle, such as an electric-powered skateboard, has many features and some example features will be discussed below. In general, an embodiment discussing an electric-powered skateboard will be discussed as an example embodiment. In general, the composite board includes a heterogeneous mix of individual components making up the composite board. The composite board includes i) a spine of the composite board made of a hardwood material connected to ii) sides of the composite board made of a vibration-dampening, high-density, foam.

FIG. 1 illustrates an example embodiment of an electric-powered electric personal transportation vehicle that includes a composite board, one or more wheels and one or more electric motors mounted to a drive truck. The electric-powered personal transportation vehicle 200, such as a skateboard illustrated here, may include a composite board 610, one or more wheels 622, one or more electric motors 630 mounted to a first drive truck 625 of one or more trucks 624, and one or more batteries 615 to power the one or more electric motors 630. For example, a pair of trucks 624 are mounted to a bottom of the composite board 610, and each truck of the pair of trucks includes an axle. The one or more batteries 615 power the electric motor 630, which is configured to drive the wheels by way of a drive system. The composite board 610 is configured to support a rider's weight while standing on the composite board 610 and operating an electric-powered personal transportation vehicle 200.

A drive truck 625 supports one or more wheels. The electric motor(s) is configured to drive the wheels. The drive truck 625 is mounted to the composite board 610 at either a front (or nose) of the composite board 610 or a back (or tail) or the composite board 610. The drive truck 625 is mounted to the composite board at the front and back of the composite board in FIG. 1. One or more batteries 615 within one or more enclosures eventually mount to the composite board 610 behind the front truck 624 or in front of the rear truck 625. For example, the battery 615 is mounted to the composite board within a battery enclosure behind the front truck in FIG. 1. In addition, the batteries 615 may mount to a bottom surface of the composite board 610 or within a compartment within the composite board 610. The internal portions of the composite board 610 itself may be the battery enclosure, with no need for a secondary battery enclosure. The one or more batteries 615 supply power to the electric motor or motor 630, electric light or lights, and other electronic equipment including various sensors. One or more processors and various software routines are configured to control the operation of the electric motor(s), light (s), sensor(s), etc.

Figure 2:
FIG. 2 illustrates an example embodiment of an electric-powered personal transportation vehicle that includes a deck, and a weight of a rider being supported by the deck, truck, and wheels.

FIG. 2 illustrates an example embodiment of an electric-powered electric personal transportation vehicle that includes a deck, and a weight of a rider being supported by the deck, truck, and wheels. In this example electric personal transportation vehicle 200, the rider may change the angles of the composite board by shifting their weight on the composite board and/or via commands given through the wireless remote. Changing the balance of the rider's weight may be used as a control input for steering and/or acceleration and/or braking.

The electric-powered electric personal transportation vehicle 200 may be controlled by a wireless remote. The wireless remote may be a stand-alone hand-held device (as shown) or in an embodiment a suitably programmed mobile computing device typically running a software application resident on that mobile computing device. In an example embodiment, the mobile computing device may be a smart phone, a smart watch, a tablet computer, etc. The mobile computing device may include a wireless transmitter, such as a radio antenna, for wirelessly communicating with the electric personal transportation vehicle. The wireless remote may use one or more antenna and/or transmission frequency to provide signals to the electric-powered electric personal transportation vehicle. Communication may be one way, two way, or networked among multiple devices communicating together with each other and/or with the electric-powered electric personal transportation vehicle 200.

The wireless remote puts the power over the board's operation in of the palm of the rider's hand. The wireless remote is configured to control the acceleration and deceleration of the electric-powered electric personal transportation vehicle from a fast or slow acceleration to a quick or gentle braking. The high performance, Bluetooth-enabled wireless remote acts as a safe, secure link between the rider and the board. The remote may or may not use the Bluetooth protocol for transmission. Any variety of wireless transmission protocols may be acceptable for transmission of signals to and from the electric-powered electric personal transportation vehicle.

The wireless remote is configured to provide a variable control of the board from a beginning rider to a pro rider. No riding experience? No problem. Multiple ride modes, such as four different pre-programmed modes, make it easier than ever to jump on a board regardless of your skill level. The wireless remote is configured to start in beginner mode, which goes up to, for example, 11 mph, and can allow a rider work their way up to pro, which tops out at, for example, 22 mph. However, the rider may manually set the mode as well as the on-board processing system may track the rider's habits and dynamically adapt the initial mode the board boots-up into. Both manually and in artificial intelligence enhanced mode, the system can switch between different modes based on riding terrain and rider skill level to maximize range and take full advantage of the board's capabilities. An artificial intelligence program can be configured to record different parameters to figure out a skill level and habits of the rider and then provide customized feedback to the rider of the board for riding on the board. For example, the artificial intelligence program can be configured to change settings on the board for acceleration and deceleration.

Figure 3:
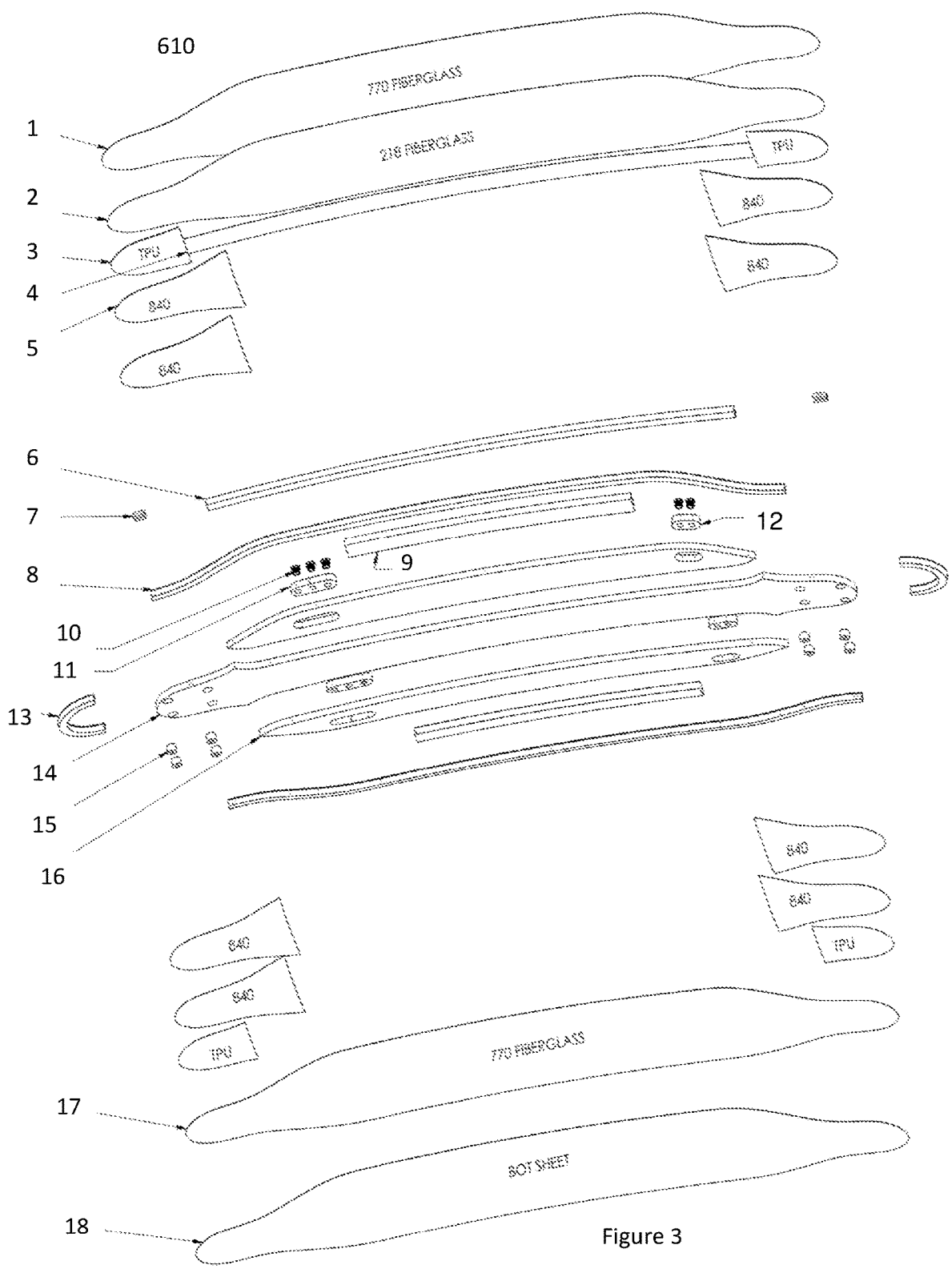
FIG. 3 illustrates an example embodiment of a flexible wooden spine for the composite board surrounded by lightweight foam material for the board and then a plastic bumper around the board for softening and safety.

FIG. 3 illustrates an example embodiment of a flexible wooden spine for the composite board surrounded by light weight foam material for the board and then a plastic bumper around the board for softening and safety.

The sandwich of layers of different materials making up the composite board 610 may include, for example, a top layer of reinforced fiberglass layer 1, made of, for example, 770 Fiberglass; a fine glass fiberglass layer 2, such as 218 Fiberglass; a tip portion and a tail portion 3 made from Thermoplastic Polyurethane (TPU); a center support beam 4 made from TPU; additional layers of fiberglass 5 sized and shaped to substantially match the tip portion and tail portion made of, for example, 840 Fiberglass; a plastic extrusion 6; extrusion plugs 7 made from Acrylonitrile Butadiene Styrene (ABS); an outside bumper ring 8 made from ABS; a core side wrap of fiberglass 9; a thread locking helicoil insert with knurled press-in brass for connection points 10; a battery housing insert for connection points made from poplar 11; a motor housing insert for connection points made from poplar 12; an outside bumper ring 13 made from ABS, a center core spine 14 made from poplar wood; bolt supports 15 made from ABS; sides of the board 16 made from high density foam; a bottom layer of reinforced fiberglass, such as 770 Fiberglass; and a bottom protective sheet 18 that is Ultra Violet ray resistant, lacquered, and has printed deck graphics. The overall composition of different parts/portions of the board 610 may be epoxied and cured to form one hardened composite board 610.

Figure 4:
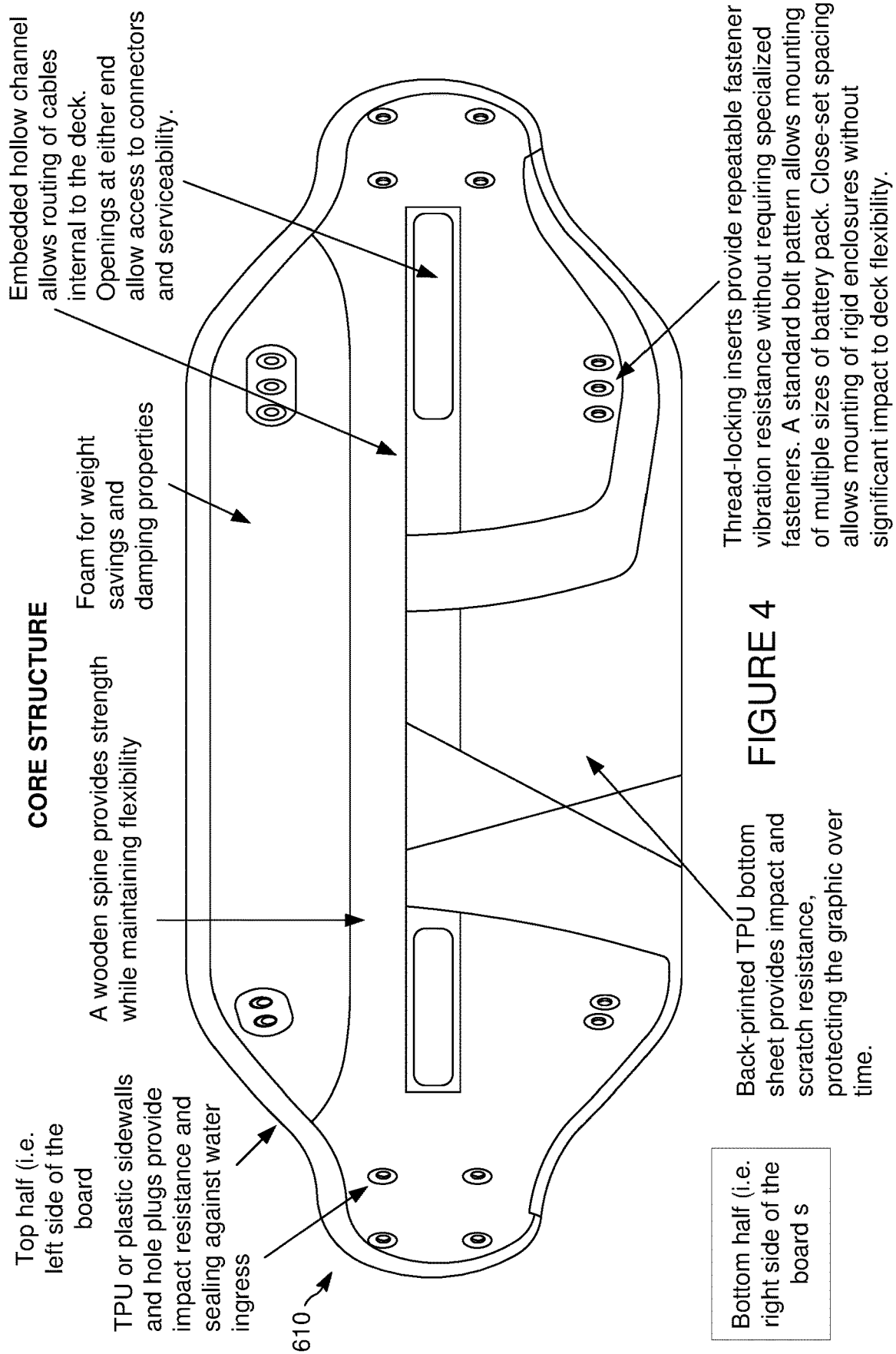
FIG. 4 illustrates an example embodiment of an electric-powered electric personal transportation vehicle that has a flexible composite board.

FIG. 4 illustrates an example embodiment of an electric-powered electric personal transportation vehicle that has a flexible composite board. In FIG. 4, the composite board 610 includes a heterogeneous mix of individual components making up the composite board 610. The composite board 610 includes i) a spine of the composite board 610 made of a hardwood material connected to ii) sides of the composite board 610 made of a vibration-dampening, high-density, foam.

The bottom half of FIG. 4 (i.e. right side) of the personal transportation vehicle, such as in this example an electric-powered skateboard shows some of its mix of individual components making up the composite board 610. The view shows a bottom up view starting at the most outer layer of the sandwich stack of materials and layers making up the composite board 610 of the personal transportation vehicle. The top half of FIG. 4 (i.e. left side) the same bottom up view but with various layers peeled away to show different features of the composite personal transportation vehicle.

The spine of the composite board 610 may be made of poplar wood. A shape of the poplar wood forming the spine of the board narrows in a middle of the composite board 610 and then widens out as the spine approaches a tip portion and a tail portion of the composite board 610.

The core of the personal transportation vehicle may be made out of lightweight hardwood preferably, poplar wood, or another hardwood—such as bamboo. In an embodiment, the core spine of the personal transportation vehicle may be made out of some other lightweight material, such as carbon fiber. The core spine is made of one of these material that are strong, durable, yet lightweight and springy. This combination of characteristics provides a proper action feeling for the ride. Note, the hardwood spine must have flexible but springy characteristics to give a proper action feeling to the user on the board, whereas the vibration dampening high density foam forming the sides provides a more dampened feeling, like a bed mattress affect. The center spine and high density foam sides form most of the suspension system for the composite board 610.

The wooden spine made from lightweight hardwood provides strength while maintaining the flexibility and spring action throughout the board. Poplar wood is lightweight and strong compared to other materials, which contributes to easy portability for the personal transportation vehicle.

The vibration-dampening, high-density, foam forming the sides may be made of i) high-density polyurethane, ii) high-density Neoprene, iii) high-density flexible PolyVinyl Chloride (PVC), and iv) any combinations of these materials. A use of this foam forming the sides gives both i) the vibration-dampening effect for a smoother ride and ii) weight savings for portability of the electric-powered personal transportation vehicle. The electric-powered personal transportation vehicle being lightweight may be lifted up and potentially carried.

As discussed, the personal transportation vehicle uses vibration dampening high density foam. The high-density lightweight foam also absorbs shock and vibration from the road for a smooth dampened ride. The high-density polyurethane, high-density Neoprene, high-density PVC, etc. also gives enough strength to support the weight of the user.

The combination of the spine made of hardwood connected to the vibration dampening high-density foam forming the sides of the personal transportation vehicle gives both a smooth but lively ride.

The composite board 610 has a bumper of polymer sidewalls around the composite board 610, which enhance impact resistance and sealing of the composite board 610. The polymer sidewalls allow impact resistance and help to protect and seal the board against water/moisture ingress. The polymer side wall bumper may be made from, for example, Acrylonitrile Butadiene Styrene (ABS) ((C8H8)x·(C4H6)y·(C3H3N)z), plastic, or Thermoplastic Polyurethane (TPU). The TPU may be thermoplastic elastomers consisting of linear segmented block copolymers composed of hard and soft segments.

The personal transportation vehicle has a wide waist or middle section to allow for a stable maneuverable standing platform optimized for any riding stands for the user. The width of the board may span the core spine, the foam sides, and the bumper of polymer sidewalls. The user's two feet can comfortably fit on the width of the board, but the width is restricted in dimension such that the sides of the board do not contact the ground when tilting the board left or right. The width of the board may be, for example, 210-250 millimeters in width.

The personal transportation vehicle can be reinforced with tri-axial layers of fiberglass, such as 770 Fiberglass, 218 Fiberglass, and another layer of 770 Fiberglass. The top and bottom sheets provide torsional stiffness and strength without giving any significant extra weight.

The composite board 610 has a tip portion and a tail portion. A first layer of fiberglass lies above the hardwood spine and a second layer of fiberglass lies below the hardwood spine at the tip and tail portions in order to reinforce and strengthen the tip portion and the tail portion of the composite board 610. The composite board 610 has a third layer of fiberglass above the hardwood spine. The third layer of fiberglass extends a length and a width of the composite board 610 to provide a torsional stiffness and strength to the composite board 610.

Again, the personal transportation vehicle has a reinforced tip and tail portions. The tip and tail portions may be made of TPU. The tip and tail portions of the personal transportation vehicle have additional areas of reinforced fiberglass, such as 840 Fiberglass, that strengthen the high stress areas and protect against fatigue over long distance with high-speeds; and thus, with high torque. The reinforced fiberglass areas are in addition, local spot areas of more fiberglass, to the general top and bottom reinforced fiberglass layer covering all or substantially all of the board.

The composite board 610 under the hardwood spine and foam sides has a protective bottom sheet. The bottom sheet layer of the personal transportation vehicle has a protective bottom sheet made of an impact resistant and scratch resistant TPU. The bottom sheet layer adds an extra layer of strength throughout the personal transportation vehicle for increased impact and wear resistance. The back printed TPU bottom sheet provides impact and scratch resistance protecting the board and any graphics printed or embed it onto the board over time.

The personal transportation vehicle has reinforced connection points in the vibration dampening high density foam sides and these inserts on all of the hardware mounts make the attachment points stronger with increased durability, whereas this allows the vibration dampening high density foam with these inserts to maintain a solid connection without fracturing or deforming at these connection sites. Thread locking helicoil inserts are made of, knurled press-in, brass. The threadlike inserts provided repeatable fastener vibration resistance without requiring specialized fasteners to not come loose when the over repeated high torque situations. The threadlike insert allows a standard bolt pattern mounting of multiple sizes of battery packs. The close-set setting and spacing of the multiple mounting fasteners allows mounting of rigid enclosures without significant impact to the deck flexibility.

Additionally, hole plugs on the board provide additional sealing beyond the topcoat against water ingress.

A rider gets a smooth and safe ride feeling when using an electric-powered electric personal transportation vehicle. Part of that smooth safe ride is the dynamic control algorithms used with the motor in the different modes of operation and the other part of the smooth ride comes from the flexible composite board 610, placement of shock absorbing material within the truck, and placement of shock absorbing material between the truck and the deck. Any or all of these elements may be used singularly, with others, or all together to affect the ride feel. These elements serve to act as a suspension system and prevent bumpiness in the road from transmitting up into the rider, thus making the ride more comfortable and controlled. Additionally, spring energy can be absorbed and released by these materials as the rider moves, which allows the rider to experience energetic motion through turns and have an enhanced experience while riding. As discussed, the composite board 610 can support the weight of the rider but the composite board 610 is also engineered with material designed to be flexible. The engineered flexible composite board 610 allows for tuned ride characteristics that act as suspension and improve rider control. Flexible, damping, torsional stiffness, and weight are examples of engineered properties that can be controlled with use of different materials and geometries forming the composite board 610 and its support system transmitting the weight to the ground. In an example, the composite board 610 has a flexible wooden spine for the composite board 610 surrounded by a lightweight material for the board and then outlined with a plastic bumper around the board for softening and safety. Additional dampening material can also be strategically put into different spots of the composite board 610 and between the composite board 610 and its trucks to smooth out the ride for the user. A cavity/gap can be formed between the truck and the bottom composite board's 610 surface. Inside the cavity/gap can be dampening material inserted into the cavity to lessen the direct jolts for the road/sidewalk from being transmitted to the rider. Also, the nose and tail of the board can be made of an ABS/plastic type material.

Figure 5A:
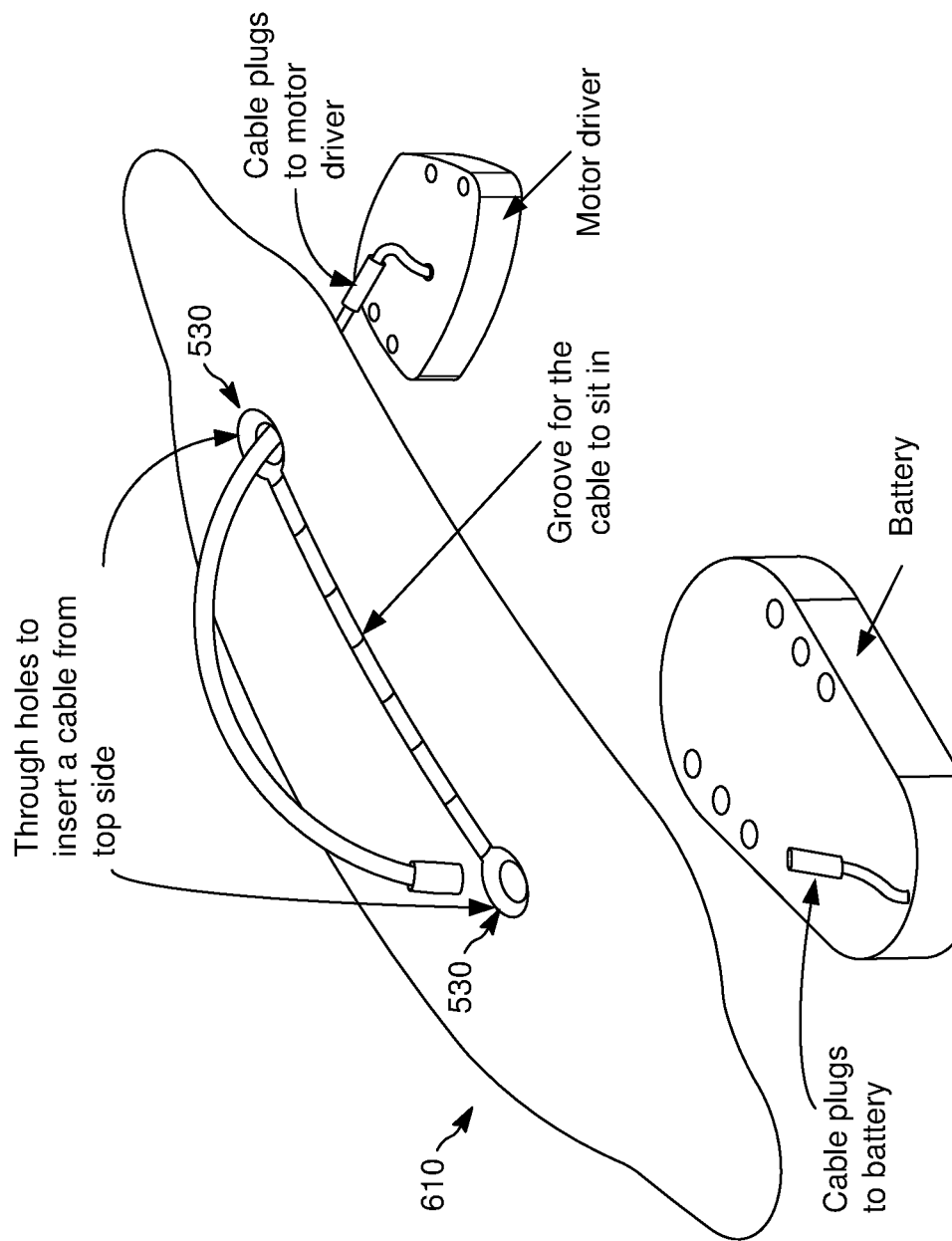
FIGS. 5A and 5B illustrate diagrams of embodiments of the composite board having a hollow channel in the composite board that allows routing of one or more cables and/or other internal components within the composite board.
Figure 5B:
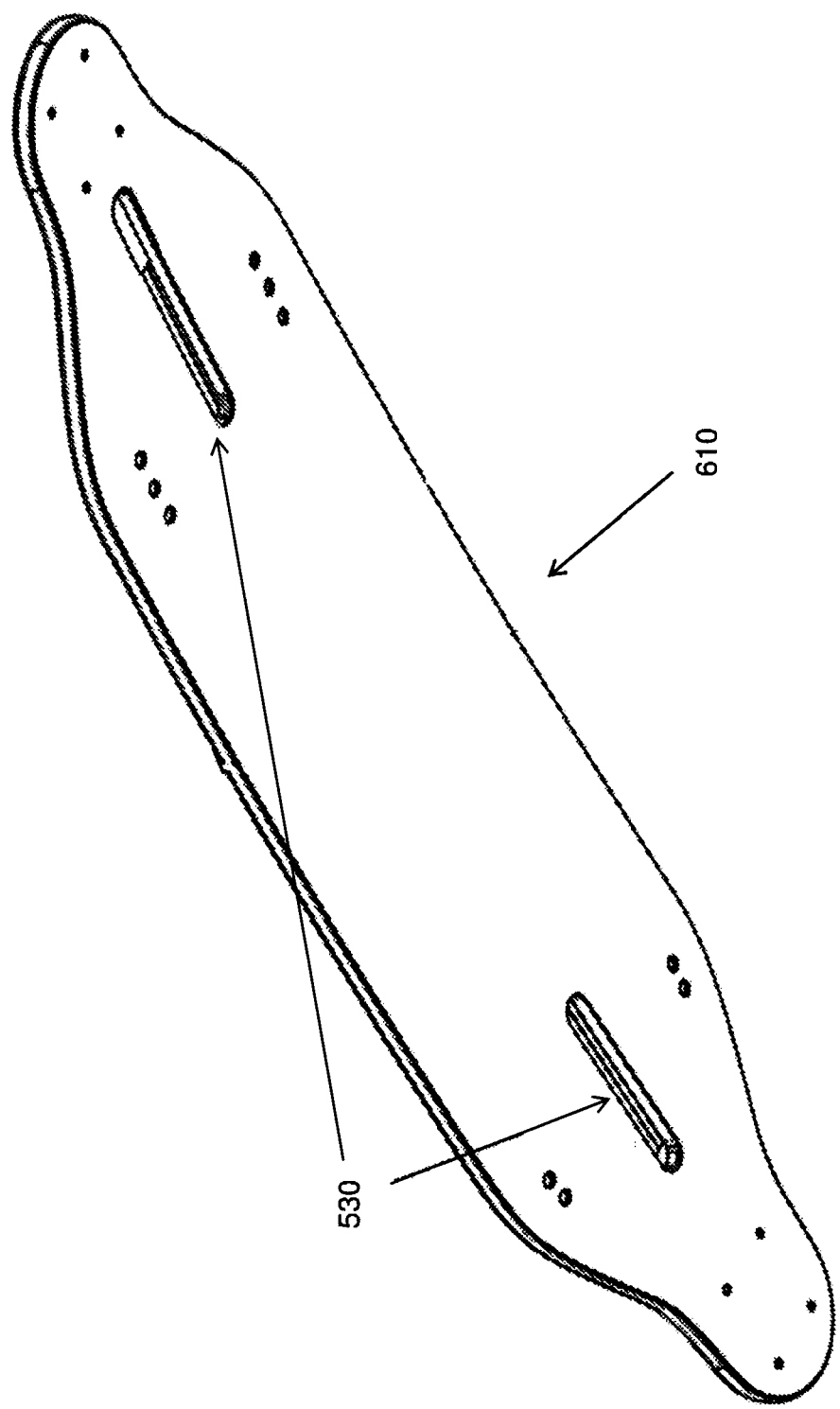

FIGS. 5A and 5B illustrate diagrams of embodiments of the composite board having a hollow channel in the composite board that allows routing of one or more cables and/or other internal components within the composite board. The hollow channel has openings 530 at either end of the channel to allow access and serviceability to the connectors and other internal components.

The composite board 610 may have one or more hollow cavities to house electrical components for wiring different electrical components together and/or housing various sensors integrated into the electric personal transportation vehicle. For example, a first hollow cavity may be designed into the board 610 with entrance holes 530 aligned from the top or bottom so that the electrical cable between the battery and the motor can be installed and removed with its electrical connectors and fittings still integrated with the cable.

Figure 6:
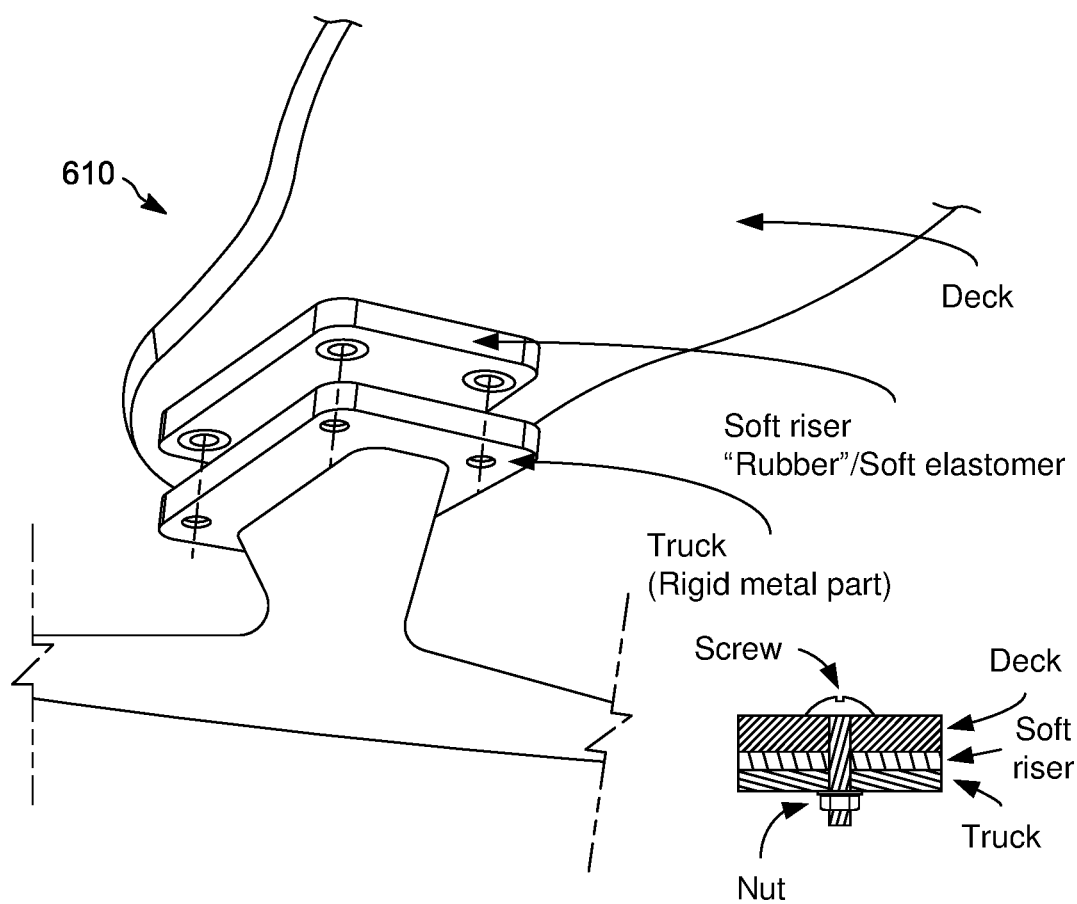
FIG. 6 illustrates a diagram of an embodiment of the composite board having a vibration absorbent material in between the wheels and the composite board.

FIG. 6 illustrates a diagram of an embodiment of the composite board having a vibration absorbent material in between the wheels and the composite board. The composite board 610 connects to a truck for a wheel of the personal transportation vehicle. In the case of the skateboard, a truck may connect for one wheel or a pair of wheels. A material for the soft riser such as i) rubber, ii) a high density foam, iii) soft elastomer, and iv) any combination of these materials, can be located in between the truck and the composite board 610 to act as an additional shock absorber to make a smoother ride on the personal transportation vehicle.

Figure 7:
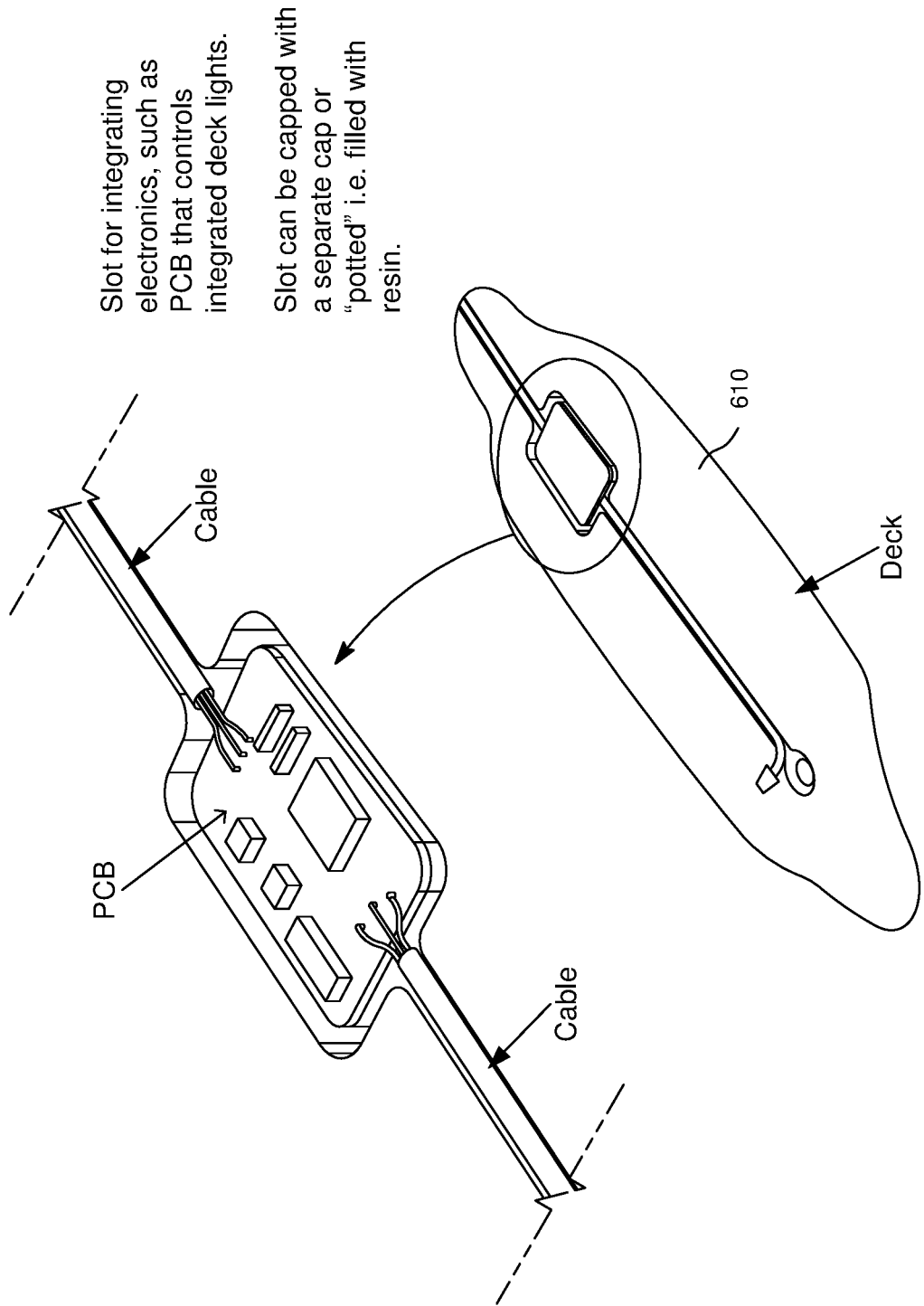
FIG. 7 illustrates a diagram of an embodiment of the composite board with an insert compartment for integrating electronic circuits and sensors into the composite board.

FIG. 7 illustrates a diagram of an embodiment of the composite board with an insert compartment for integrating electronic circuits and sensors into the composite board.

Figure 8:
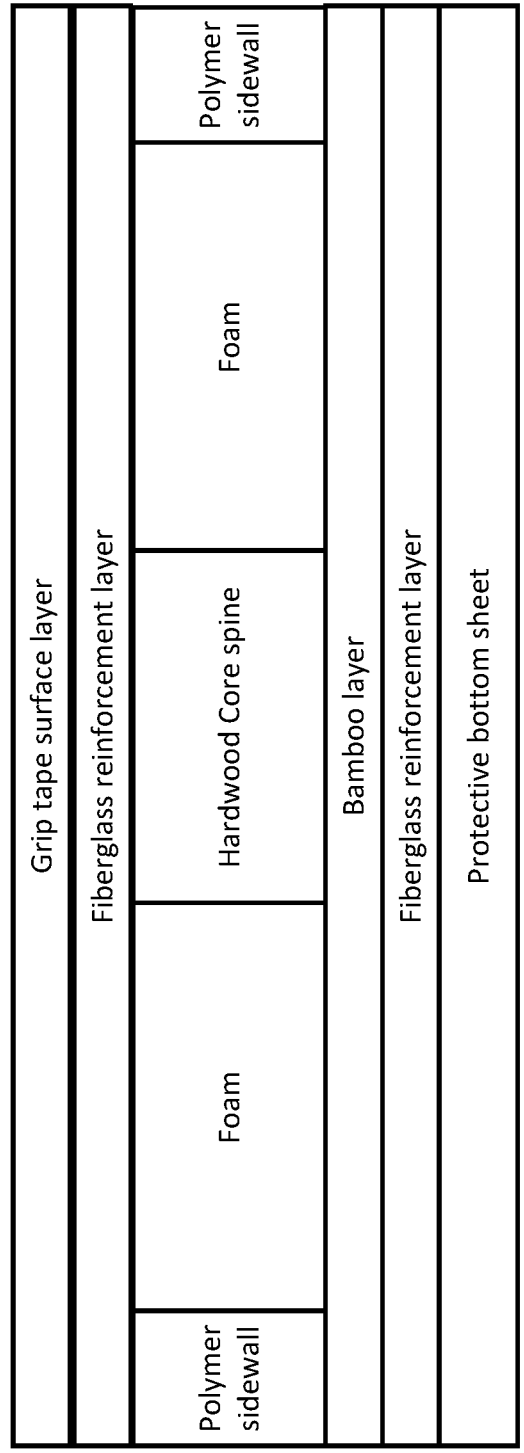
FIG. 8 illustrates a diagram of an embodiment of the composite board with a sandwich of layers making up that composite board.

FIG. 8 illustrates a diagram of an embodiment of the composite board with a sandwich of layers making up that composite board. The sandwich layers of the composite board 610 may include various layers such as a grip tape surface layer, a top fiberglass reinforcement layer, a hardwood core spine, high density foam, polymer sidewall, an optional bamboo layer, a bottom fiberglass reinforcement layer, fiberglass reinforcement layers for the tip and tail portions of the board, and a protective bottom sheet.

Note, the user can customize the esthetics—color of their board with the plastic bumper and decals on the deck. Also, some other weight-saving mechanisms/techniques have been developed for the board while still keeping the board flexible.

The electrical lights of the electric personal transportation vehicle may be powered through one of the access ports in the motor driver unit. A power line connects to the access port in the motor driver unit. One or more light strips may contain the electrical lights. The lights may also be powered directly from the battery's main power and communication bus. The lights may have their own power source. The light strip may have an additional control unit or electrical resistance circuit to step down an amount of the electrical voltage being supplied to the lights and/or to control an operational behavior of the electrical lights.

A user may activate the electrical lights on the composite board using the wireless handheld remote. In addition, the lights can also be activated automatically by i) an impulse from the motor driver when signaling breaking lights, or ii) sensing a shift in weight/command from the remote to turn left or right by the rider. In addition, the lights on the board as well as in the remote can also be activated by the on-board navigation system to indicate which way to turn to the user, etc. Also, a signal can be sent by an ambient light sensor to either increase or decrease an amount of lumens the lights need to emit depending on whether the ambient light sensor detects whether it is currently daytime, nighttime, or dusk. The lights may be controlled automatically by the skateboard's electrical system sensing changes in motion either through changes in motor or wheel speed, acceleration, or other sensor inputs.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. An apparatus, comprising:
   an electric-powered personal transportation vehicle with a composite board to support a weight of a user, one or more wheels driven by one or more electric motors, where the electric motors are powered by one or more batteries; and
   where the composite board includes a heterogeneous mix of individual components making up the composite board, where the composite board includes i) a spine of the composite board made of a hardwood material and ii) the spine of the composite board is sandwiched between a pair of vibration-dampening, high-density, foam strips.

2. The apparatus of claim 1, wherein the spine of the composite board is made of poplar wood and a shape of the poplar wood forming the spine of the board narrows in a middle of the composite board and then widens out as the spine approaches a tip portion and a tail portion of the composite board.

3. The apparatus of claim 1, wherein the vibration-dampening, high-density, foam forming the sides is made of a material selected from a group consisting of i) high-density polyurethane, ii) high-density Neoprene, iii) high-density flexible PolyVinyl Chloride, and iv) any combinations of these materials, where a use of this foam forming the sides gives both i) the vibration-dampening effect for a smoother ride and ii) weight savings for portability and lifting up of the electric-powered personal transportation vehicle.

4. The apparatus of claim 1, wherein the composite board has a bumper of polymer side walls around the composite board, which enhance impact resistance and sealing of the composite board.

5. The apparatus of claim 1, wherein the composite board connects to a truck for a first wheel of the personal transportation vehicle, and
where a material selected from a group consisting of i) rubber, ii) a high density foam, and iii) any combination of these materials, is located in between the truck and the composite board to act as a shock absorber to make a smoother ride on the personal transportation.

6. The apparatus of claim 1, wherein the composite board has a tip portion and a tail portion, where a first layer of fiberglass lies above the hardwood spine and a second layer of fiberglass lies below the hardwood spine at the tip and tail portions in order to reinforce a strength of the tip portion and the tail portion of the composite board.

7. The apparatus of claim 6, wherein the composite board has a third layer of fiberglass above the hardwood spine and the third layer of fiberglass extends a length and a width of the composite board to provide a torsional stiffness and strength to the composite board.

8. The apparatus of claim 1, wherein the composite board has a middle section of the composite board to allow for a stable standing platform for the user, where the user's two feet can comfortably fit on a width of the board but the width is restricted in dimension such that the sides of the composite board do not contact the ground when tilting the composite board left or right.

9. The apparatus of claim 1, wherein the composite board under the hardwood spine and foam sides has a protective bottom sheet made of an impact resistant and scratch resistant Thermoplastic Polyurethane (TPU).

10. The apparatus of claim 1, wherein the composite board has a hollow channel in the composite board that allows routing of one or more cables and/or other internal components within the composite board, where the hollow channel has openings at either end of the channel to allow access and serviceability.

11. The apparatus of claim 1, wherein the composite board is a sandwich of layers of different materials comprising a bottom fiberglass reinforcement layer, the spine of the composite board, and a top fiberglass reinforcement layer.

12. An method for constructing an electric-powered personal transportation vehicle with a composite board, comprising:

constructing an electric-powered personal transportation vehicle with a composite board to support a weight of a user, one or more wheels driven by one or more electric motors, where the electric motors are powered by one or more batteries; and
constructing the composite board to include a heterogeneous mix of individual components making up the composite board, where the composite board includes i) a spine of the composite board made of a hardwood material and ii) the spine of the composite board is sandwiched between a pair of vibration-dampening, high-density, foam strips.

13. The method of claim 12, further comprising:
making the spine of the composite board of poplar wood; and
making a shape of the poplar wood forming the spine of the board to narrow in a middle of the composite board and then widen out as the spine approaches a tip portion and a tail portion of the composite board.

14. The method of claim 12, further comprising:
making the sides of the composite board with the vibration-dampening, high-density, foam selected from a group consisting of i) high-density polyurethane, ii) high-density Neoprene, iii) high-density flexible PolyVinyl Chloride, and iv) any combinations of these materials, where a use of this foam forming the sides gives both i) the vibration-dampening effect for a smoother ride and ii) weight savings for portability and lifting up of the electric-powered personal transportation vehicle.

15. The method of claim 12, further comprising:
using a bumper of polymer side walls around the composite board to enhance impact resistance and sealing of the composite board.

16. The method of claim 12, further comprising:
connecting a truck for a first wheel of the personal transportation vehicle to the composite board, where a material selected from a group consisting of i) rubber, ii) a high density foam, and iii) any combination of these materials, is located in between the truck and the composite board to act as a shock absorber to make a smoother ride on the personal transportation.

17. The method of claim 12, further comprising:
using a first layer of fiberglass above the hardwood spine and a second layer of fiberglass below the hardwood spine at a tip and tail portions in order to reinforce a strength of the tip portion and the tail portion of the composite board.

18. The method of claim 17, further comprising:
using a third layer of fiberglass above the hardwood spine that extends a length and a width of the composite board to provide a torsional stiffness and strength to the composite board.

19. The method of claim 12, wherein the composite board has a middle section of the composite board to allow for a stable standing platform for the user, where the user's two feet can comfortably fit on a width of the board but the width is restricted in dimension such that the sides of the composite board do not contact the ground when tilting the composite board left or right.

20. The method of claim 12 further comprising:
using a protective bottom sheet made of an impact resistant and scratch resistant Thermoplastic Polyurethane (TPU) under the hardwood spine and foam sides.

21. The method of claim 12, wherein the composite board has a hollow channel in the composite board that allows routing of one or more cables and/or other internal components within the composite board, where the hollow channel has openings at either end of the channel to allow access and serviceability.

22. The method of claim 12, wherein the composite board is a sandwich of layers of different materials comprising a bottom fiberglass reinforcement layer, the spine of the composite board, and a top fiberglass reinforcement layer.

* * * * *